United States Patent [19]

Jako

[11] Patent Number: 4,571,038
[45] Date of Patent: Feb. 18, 1986

[54] BINOCULAR ZOOM MICROSCOPE

[76] Inventor: Geza J. Jako, 169 E. Emerson St., Melrose, Mass. 02176

[21] Appl. No.: 439,839

[22] Filed: Nov. 8, 1982

[51] Int. Cl.⁴ ............................................. G02B 21/22
[52] U.S. Cl. ...................... 350/515; 350/519
[58] Field of Search ............... 350/514, 515, 516, 519, 350/523, 410

[56] References Cited

U.S. PATENT DOCUMENTS

| | | |
|---|---|---|
| 2,662,443 | 12/1953 | Loeck . |
| 2,735,337 | 8/1953 | Frischmann . |
| 2,845,842 | 7/1958 | Leitz . |
| 3,186,300 | 6/1965 | Littmann . |
| 3,637,283 | 1/1972 | Tasaki et al. .......................... 350/515 |
| 3,776,614 | 12/1973 | Kloots et al. . |
| 3,840,291 | 10/1974 | Littmann et al. . |
| 3,909,106 | 9/1975 | Buhler . |
| 4,059,336 | 11/1977 | Hopkins .......................... 350/515 X |
| 4,134,637 | 1/1979 | Leisegang .......................... 350/514 X |
| 4,138,191 | 2/1979 | Peyman et al. . |

FOREIGN PATENT DOCUMENTS 1127176  1/1967  U.S.S.R. ............................... 350/410

OTHER PUBLICATIONS

*Ophthalmic Surgery*, Spring, 1973, vol. 4, No. 1, pp. 41–42.

Primary Examiner—John K. Corbin
Assistant Examiner—Vincent J. Lemmo
Attorney, Agent, or Firm—Hamilton, Brook, Smith & Reynolds

[57] ABSTRACT

The invention resides in a binocular microscope which has a collimating lens 20 and a pair of monocular tubes 28 in optical alignment with it. Each tube has, as minimum components of its optical system, an objective 22 and an eyepiece 36. The optical axes 64 of the objectives are maintained at all times parallel to and at a fixed distance from each other. The optical axes 94 of the eyepieces are also at all times parallel to each other as well as to the axes of the objectives. However, the distance between the eyepiece axes 94 is variable, and there are means to vary the distance to accommodate the inter-pupillary distance of the viewer without causing line of sight convergence. A magnification changer 30 is positioned in each monocular tube 28 in the optical path between the eyepiece 36 and the objective 22. Means are provided for operating the magnification changers independently of changes in the distance between the eyepieces.

6 Claims, 6 Drawing Figures

BINOCULAR ZOOM MICROSCOPE

DESCRIPTION

1. Technical Field

This invention relates to binocular microscopes in general, and more particularly to microscopes used in dentistry.

2. Background Art

There are two basic types of binocular microscopes; one is called the Greenough microscope and the other the Galilean microscope. Both have been in use for many years and, generally speaking, produce low magnification. The Greenough type which is essentially a pair of simple compound microscopes assembled with converging axes to permit their individual objective lenses to focus on and observe one object. The converging axes require the observer also to converge his eyes as he looks through the eyepieces at the ends of the monocular tubes. For more than short periods of usage, this results in fatigue of the eyes even though the eyepieces or the binocular tubes may be adjusted transaxially to accommodate the observer's individual interpupillary distance.

The Galilean microscope, on the other hand, offers relatively strain-free observation because it does not require eye convergence. The microscope employs a single objective lens called a collimating lens, which while focused on a point relatively close to it, causes the rays emanating from it to be directed in parallel lines or beams. These parallel lines are observed by a pair of monocular tubes which are in optical alignment with the collimating lens. Each monocular has its own objective, image reversing prisms and eyepiece. Since the light rays passing from the collimating lens through each of the monoculars of the binocular system, including the eyepieces, are at all times parallel, the line of sight and thus the eyes of the observer need not converge, and hence, fatigue is eliminated.

Galilean type binocular microscopes, generally called surgical microscopes, became available in the mid-1950's. At that time, it was desirable to have variable magnification, and the earlier surgical microscopes were provided with interchangeable eyepieces for the purpose of changing magnification.

Subsequently, a turret type magnification changer was employed. The magnification system, which included lenses of different magnification, was positioned in the optical axes between the objective lenses of the individual monoculars and the collimating or objective lens of the magnifying microscope. These were very expensive and bulky.

Subsequently, zoom magnifying surgical microscopes became available, whereby magnification change was accomplished by positioning variable zoom telescopes between the objective lenses of the individual monoculars and the collimating lens of the system per se, i.e., in the same location as the turret system. It, too, was bulky.

It is essential in any microscope that will be used by the observer continuously for relatively long periods of time, such as a dental or surgical microscope, that there be provision for adjusting the individual oculars or eyepiece portions of the monoculars to accommodate the interpupillary distances of the user. Such adjustment is shown in early Leitz U.S. Pat. Nos. 2,845,842 and 2,735,337. However, since in both of these patented microscopes a single objective lens was used which was common to both eyepieces, complicated means had to be provided to assure that the focal length between the eyepieces and the common objective remained constant.

In the early 1970's binocular microscopes were developed which combined magnification changing and adjustment of interpupillary spacing. One such microscope is shown in U.S. Pat. No. 3,909,106, which issued Sept. 30, 1975 to Euler. As in the early microscopes, a magnification changer was positioned between the main objective or collimating lens and the individual objectives of the two monoculars. Added to this old concept was the provision of permitting the individual monoculars to be rotatable about the optical axes of their respective tube objectives. However, because the line of sight axis of the eyepiece was angularly positioned relative to the individual objectives through a prism, as the eyepieces were pivoted away from each other, there was line of sight convergence. This feature was said to be beneficial in stereo observations. However, line of sight convergence, as stated previously, tends to be tiring to the observer's eyes, and it is a specific objective of this invention to provide for interpupillary adjustment without line of sight convergence.

DISCLOSURE OF THE INVENTION

The invention resides in a binocular microscope which has a collimating lens and a pair of monocular tubes in optical alignment with it. Each tube has, as minimum components of its optical system, an objective and an eyepiece. The optical axes of the objectives are maintained at all times parallel to and at a fixed distance from each other. The optical axes of the eyepieces are also at all times parallel to each other as well as to the axes of the objectives. However, the distance between the eyepiece axes is variable, and there are means to vary the distance to accommodate the inter-pupillary distance of the viewer without causing line of sight convergence.

A magnification changer is positioned in each monocular tube in the optical path between the eyepiece and the objective. Means are provided for operating the magnification changers independently of changes in the distance between the eyepieces.

The microscope also has means to accept mechanism for recording what is being observed by the viewer as well as having lenses for concentrating light from fibre optic bundles at the focal point of the microscope.

The above and other features of the invention including various novel details of construction and combinations of parts will now be more particularly described with reference to the accompanying drawings and pointed out in the claims. It will be understood that the particular binocular zoom microscope embodying the invention is shown by way of illustration only and not as a limitation of the invention. The principles and features of this invention may be employed in varied and numerous embodiments without departing from the scope of the invention.

BEST MODE OF CARRYING OUT THE INVENTION

Figure 1:
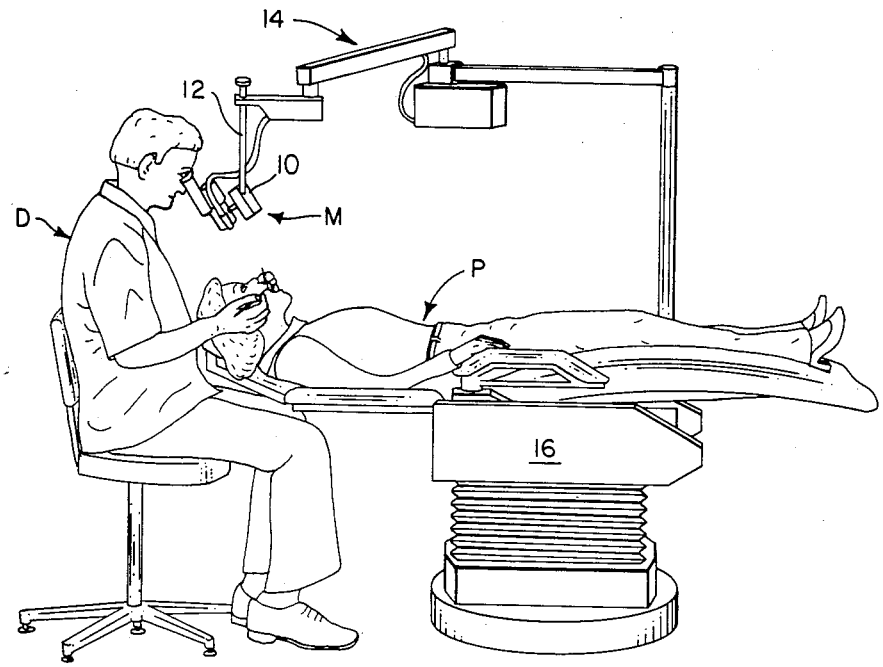
FIG. 1 is a side elevation of a binocular microscope mounted on a dental chair.

FIG. 1 shows a binocular microscope embodying the present invention, in one intended environment. It is pivotally mounted at 10 on a rod 12 carried at the end of a compound support 14. The support is mounted on a dental chair 16 and provides universal movement relative to a patient P and a dentist D. The microscope is of fixed focus and consequently is moved so that its focal point is brought to the operative field in the patient's mouth.

Figure 2:
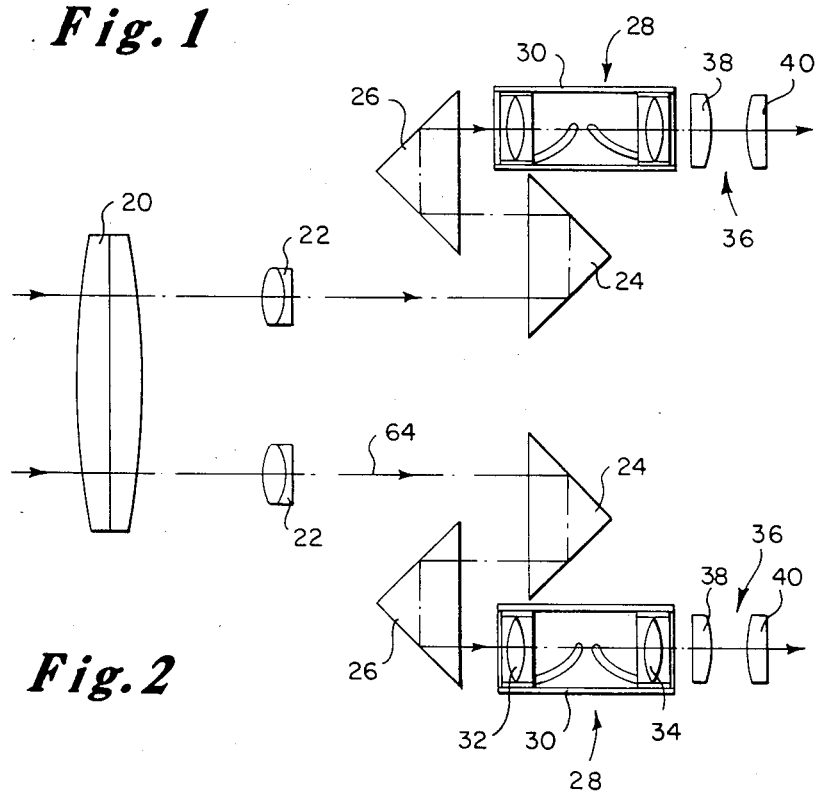
FIG. 2 is a schematic plan view of the optical system of an illustrative binocular microscope embodying the invention.

The basic optical elements of the system are shown schematically in FIG. 2. They comprise a compound collimating lens 20 which is the main objective lens of the binocular system. The focal point of the system is not shown, but is to the left of the collimating lens. Two objectives 22 each constitute the inlet elements of a pair of monocular systems or tubes 28.

Prisms 24 and 26 are positioned in the systems 28 in conventional manner. It should be noted that while prism 26 is shown schematically oriented in the same plane as prism 24, it is actually oriented at right angles to the prism 24, as will be explained hereinafter. The monocular systems 28 also include a magnification changer 30 comprising a front lens element 32 and a rear lens element 34 as well as a compound eyepiece 36 including a front element 38 and a rear element 40. Each magnification changer is positioned in the optical path between the eyepiece 36 and the objective 22.

Figure 3:
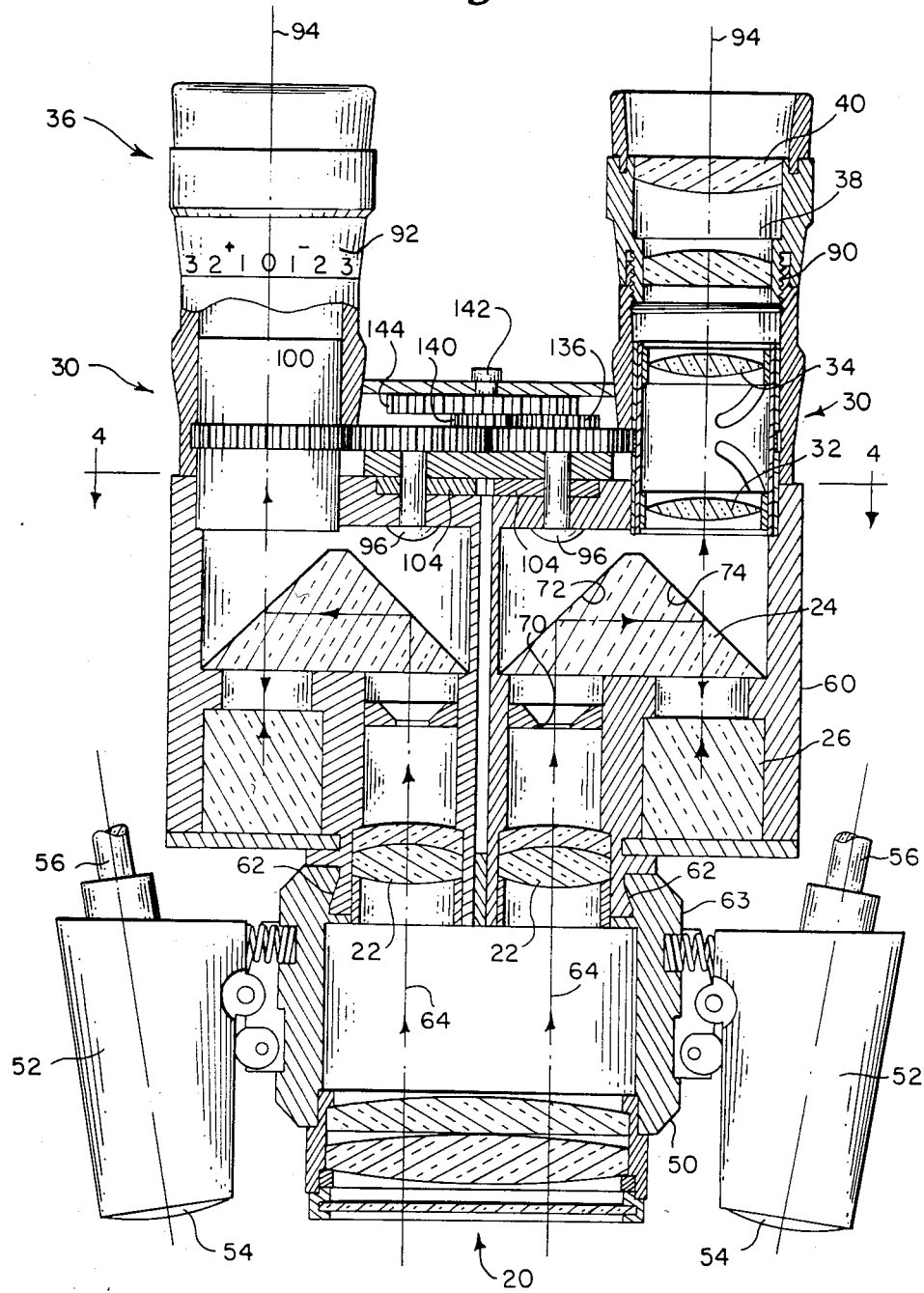
FIG. 3 is a plan view of the microscope partly in section, the section being taken along the line 3—3 on FIG. 5.

Referring to FIG. 3, the microscope has a main housing 50 which mounts at its lower end (as viewed in the Figure) the compound collimating lens system 20. Mounted for pivotal adjustment on the housing 50 are a pair of lights 52 having lenses 54 for concentrating light from fiber optic bundle 56 at the focal point of the collimating lens. By moving the microscope so that the lights concentrate on the dental field, the microscope will be in focus.

An opening 56 (FIG. 6) normally covered by a cap 59 (FIGS. 4 and 5) permits the attachment to the microscope of a video system camera or 35 millimeter still camera to review or record everything the surgeon or dentist is observing.

Again referring to FIG. 3, each monocular tube or ocular system 28, as it is also called, is mounted in a housing 60 which is pivotally received in a bearing member 62 in the collimating lens housing 63. This permits pivotal movement about the optical center or axis 64 of each monocular objective 22. The optical axes 64 always remain parallel and are always at the same distance from each other.

Since a collimating lens produces parallel rays of light, the objectives 22 are always in optical alignment (in this case parallelism) with the collimating lens 20, and remain optically and physically at a fixed distance therefrom even though they are rotated about their own optical centerlines 64 as will be explained hereinafter.

Figure 5:
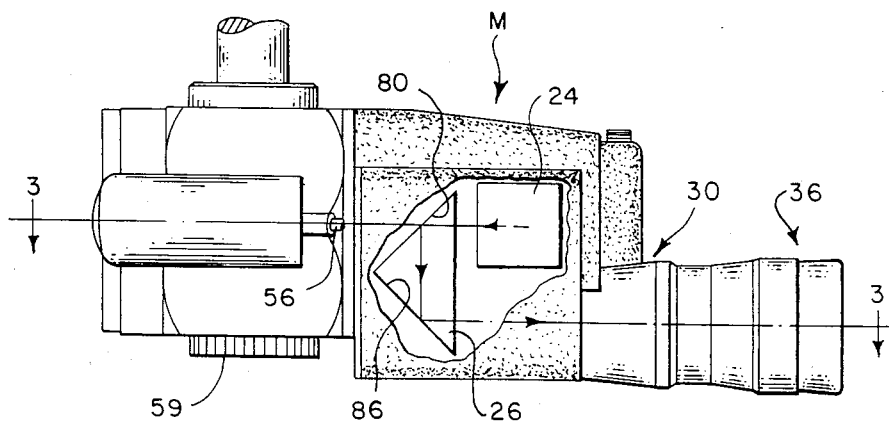
FIG. 5 is a side view of the microscope partly broken away.

The light path through the system will now be explained with reference to one of the two identical monocular tubes 28. The light enters the monocular through the objective 22, then passes through an aperture 70 which is shown in the drawings to be fixed but may, if desired, be made variable. The light then strikes the inner surface 72 of prism 24 and is reflected at a ninety degree angle to the opposite reflecting surface 74 there to be reflected again at right angles thus reversing the direction with which it entered the prism 24. The light then enters prism 26 which is best seen in FIG. 5. It should be noted that prism 26 is oriented at right angles to prism 24 thereby reversing and directing the light rays in a direction downwardly, as viewed in FIG. 5, by successively striking and being reflected from right angle reflecting surfaces 80 and 86 of prism 26. The light then passes through the magnification changer 30 of the monocular tubes 28, passing successively through lenses 32 and 34, thence through the eyepiece lenses 38 and 40.

The eyepiece element 40 is individually optically adjustable relative to the element 38 to accommodate differing eye characteristics of the individual viewer by a conventional threaded connection 90 on the ocular tubes. The correction is readable on a diopter scale 92 on the exterior of the ocular tube.

The distance between the oculars or eyepieces 36 are adjustable to accommodate the interpupillary distance of the viewer. Conventionally, in a prism binocular used as a double telescope for viewing objects at distances up to infinity, the individual monoculars are hinged together along a central axis located halfway between them. Each entire monocular from eyepiece to objective pivots about this one central axis. The eyepiece moves in one arc about the central axis and the objective moves in a second arc about the same central axis. Thus, as the eyepieces come closer or farther apart to accommodate interpupillary variances, the objectives likewise move closer or farther apart. This is immaterial in a distance viewing binocular. It is because, when objects at great distances are being viewed, the angular cone is so small that changes in objective separation result in no perceptible viewing differences. This is not so, however, where the objectives of the binoculars are viewing an object close up, to wit, the parallel rays coming through the collimating lens of a microscope which, in turn, is magnifying an object no more than a few feet away, at most. Were conventional interpupillary adjustment to be employed, i.e., pivoting the entire monoculars, including the objectives in arcs about one central axis, the resultant movement of the objectives relative to each other would change the field of view each time an interpupillary adjustment were made by pivoting the eyepieces closer or farther apart.

Maintaining a constant field of view is accomplished by the present invention by assuring that there is no lateral or relative separation of the axes 64 of the objectives 22 when the eyepieces 40 are pivoted apart or together. Furthermore, axial convergence is precluded by the present invention. Stating it differently, the optical axes or centers 94 of the eyepieces always remain parallel but are swung toward and away from each other about the optical cental axes 64 of their respective objective lenses 22. The axes 64 are not only always parallel but at a constant distance from each other and thus maintain a constant optical alignment with the collimating lens.

Figure 4:
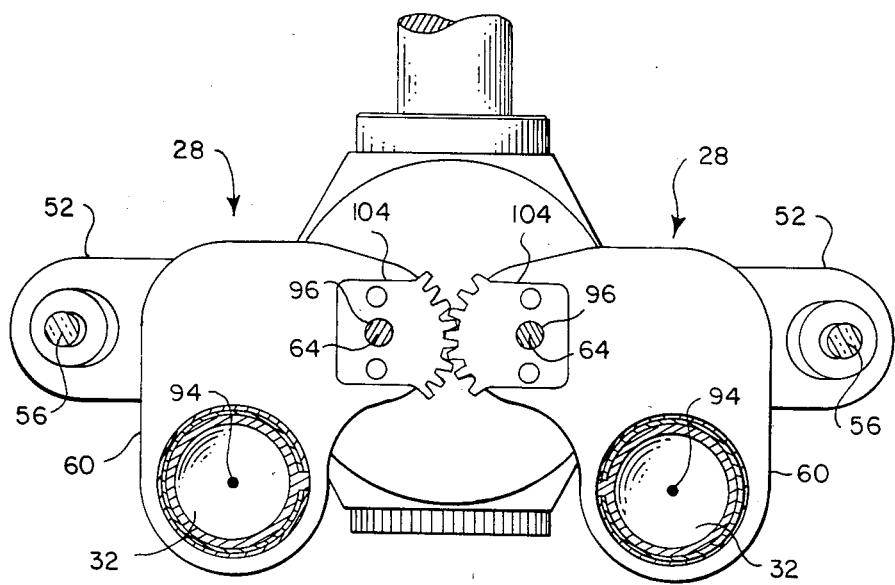
FIG. 4 is a sectional end view of the microscope taken along the line 4—4 on FIG. 3.

As seen in FIGS. 3 and 4, pivot pins 96 secure the housings 60 of the individual monoculars to a platelike member which is centrally located between the individual monoculars. The pins 96 are each centered on one of the optical axis 64 of the objective lenses 22. Each pin 96 also mounts a gear plate 104 to transmit equal arcuate motion from one monocular to the other as the housings 60 are manually pivoted relative to the bearing member 62 and the pins 96 which are axially aligned.

Magnification changes have traditionally been accomplished by interchanging individual eyepieces or, as indicated earlier, by a turret-type magnification changer positioned between the monocular objectives and the collimating or objective lens of the total system. In accordance with the present invention, magnification is varied in zoom fashion by rotatively moving lens elements 32 and 34 toward and away from each other. As seen best in FIG. 6, lens element 34 is mounted in a ring 110 which has a pin 112 projecting laterally from it. The pin is engaged within an arcuate cam slot 114 formed in a sleeve 116, slidably and rotatably contained within a cylindrical barrel 118. A longitudinal, exterior slot 120 is formed in the barrel 118 parallel to the optical axis 94 of the eyepiece or ocular system. The pin 112 projects through the arcuate cam slot 114 into the longitudinal slot 120 in the barrel 118.

Rotary motion is imparted to the barrel 118 by a gear 122 fixed to and surrounding its outer surface. Since both the ring 110 and the barrel 118 are rotatable relative to the sleeve 116, arcuate motion is imparted by way of the slot 120 to the pin 112 and hence to the lens 34 as the sleeve 118 rotates relative to the sleeve 116. This causes the pin 112 to ride up or down in the cam slot 114 causing the lens 34 to move toward or away from the lens 32 to increase or decrease magnification.

Figure 6:
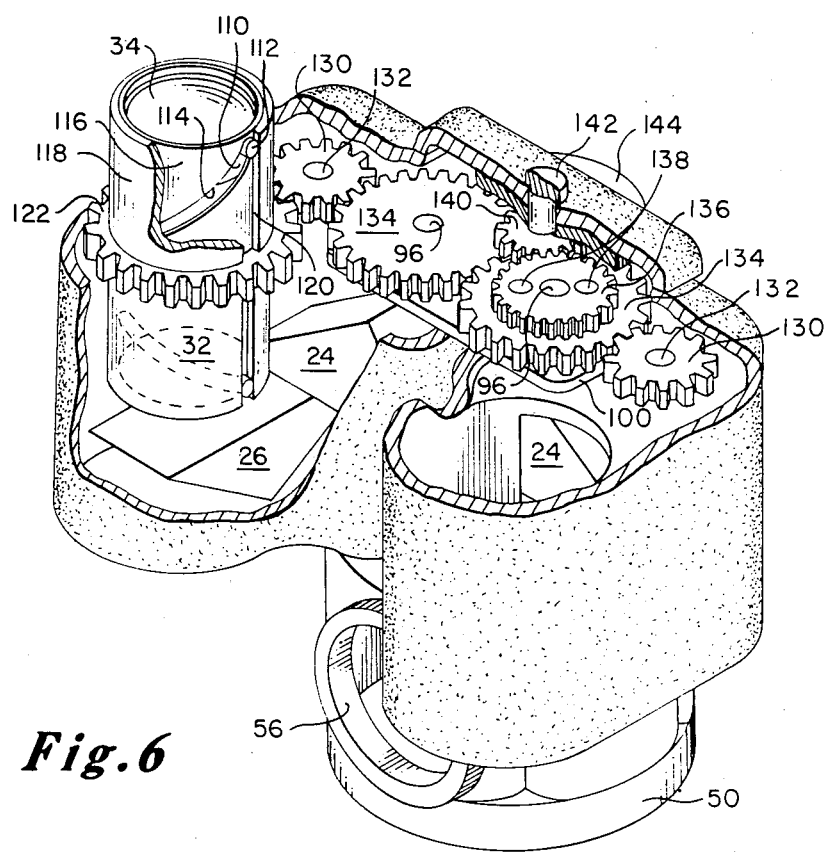
FIG. 6 is a perspective view thereof, partially broken away.

As an option, in like manner, the lens 32, as shown schematically in FIG. 6, may be caused to move simultaneously toward or away from the lens 34 to double the degree of magnification.

The gears 122 and hence the barrel 118 each derive their motion through a gear train comprising pinions 130 rotatably mounted upon stud 132 (FIG. 6). Each pinion 130 engages a gear 134 which is pivoted on the pin 96 about which the ocular eyepieces rotate to change interpupillary distance. The gear 134 meshes with a like gear pivoted on the other pin 96. A connecting gear 136 is pinned at 138 to the gear 134 and meshes with a pinion 140 which by means of a pin 142 is secured to a hand wheel 144. Thus, through rotation of the wheel 144, the observer imparts motion to the lenses 32 and 34 to vary magnification without effecting the interpupillary setting of the microscope.

Conversely, the interpupillary distance can be varied without effecting the magnification by pivoting the individual monoculars about the pins 96 as hereinabove described.

I claim:

1. A binocular zoom microscope having a collimating lens and a pair of monocular systems in parallel optical alignment with the collimating lens, each monocular system having an objective lens, a zoom magnification changer and a compound eyepiece, the zoom magnification changer of each monocular system being located adjacent the compound eyepiece and on the same axis, the objective lens being located on an axis spaced from and parallel to the eyepiece axis, means for pivoting each monocular system about the axis of its objective lens to change the distance between the compound eyepieces to accommodate the interpupillary distance of the viewer without line of sight convergence and gear means for operating the zoom magnification changers of both monocular systems simultaneously in zoom fashion and independently of changes in the distance between the compound eyepieces.

2. A binocular zoom microscope in accordance with claim 1 having means to accept mechanism for recording what is being observed by the viewer.

3. A binocular zoom microscope in accordance with claim 1, having lenses for concentrating light from fibre optic bundles at the focal point of the microscope.

4. A binocular zoom microscope having a collimating lens and a pair of monocular systems in optical alignment with the collimating lens, each monocular system having an objective lens and an eyepiece, the optical axes of the objective lenses being at all times parallel and at a fixed distance from each other, the optical axes of the eyepieces being at all times parallel to the axes of the objectives and at a variable distance from each other, means in alignment with the optical axes of the objective lenses and located on both sides thereof, for rotatably supporting the monocular systems for relative pivotal movement, means for pivoting the monocular systems relative to each other about the axes of their respective objective lenses to vary the distance between the eyepiece axes to accommodate the interpupillary distance of the viewer without causing line of sight convergence, a zoom magnification changer in each monocular system adjacent the eyepiece and positioned in the optical path between the eyepiece and the objective, and means rotatably supported by the support means of the monocular systems which are nearest the eyepieces for operating the magnification changers of both monocular systems simultaneously in zoom fashion and independently of changes in the distance between eyepieces.

5. A binocular microscope in accordance with claim 4 having lenses for concentrating light from fibre optic bundles at the focal point of the microscope.

6. A binocular microscope in accordance with claim 4 having means to accept mechanism for recording what is being observed by the viewer.

* * * * *